2 Sheets—Sheet 1.
J. C. BEAN
Cultivator.
No. 209,005. Patented Oct. 15, 1878.
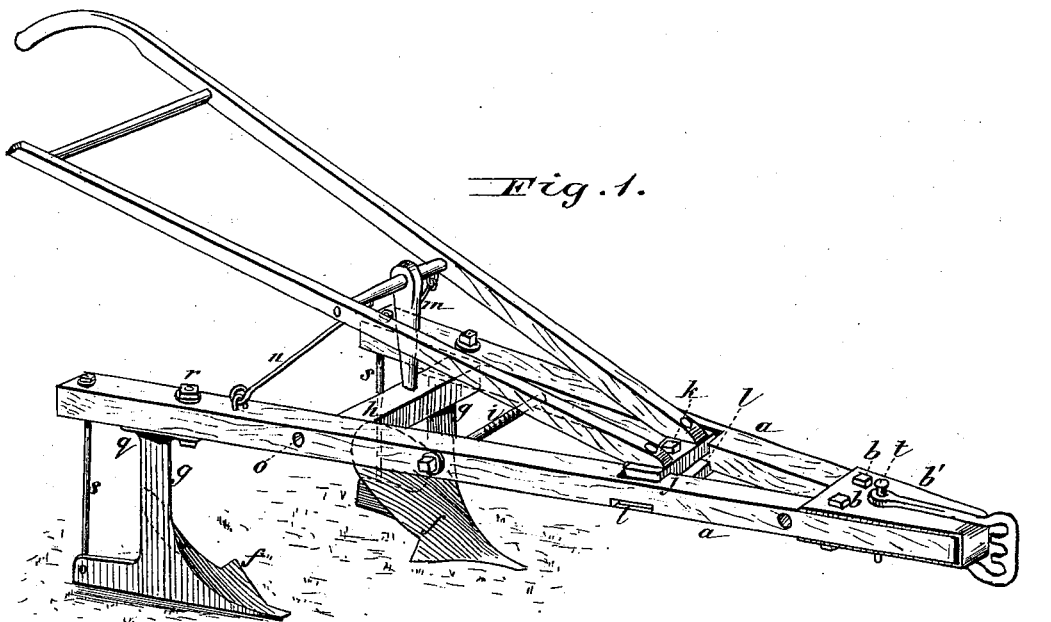
Fig. 1.
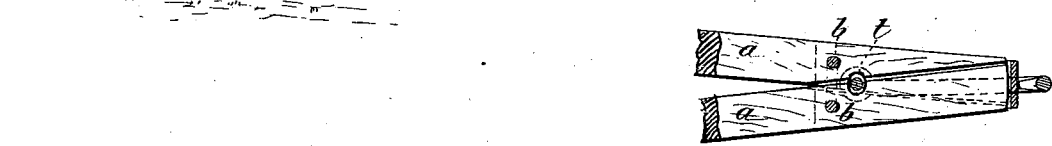
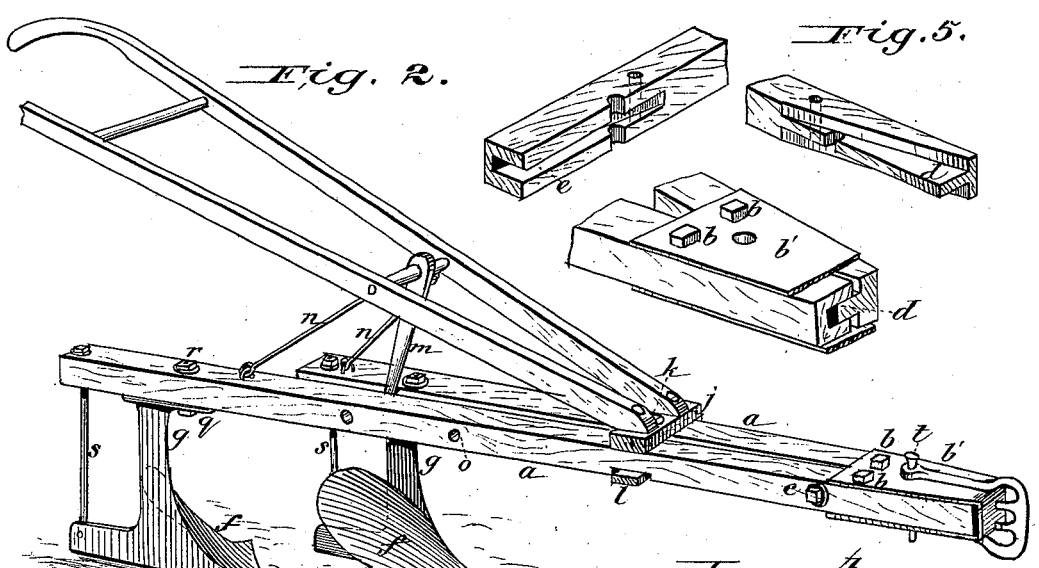
Fig. 2. Fig. 5.
Attest:
H. L. Perrine
J. A. Rutherford
Inventor:
John C. Bean
By Johnson & Johnson
Atty's J. C. BEAN.
Cultivator.
No. 209,005.  Patented Oct. 15, 1878.
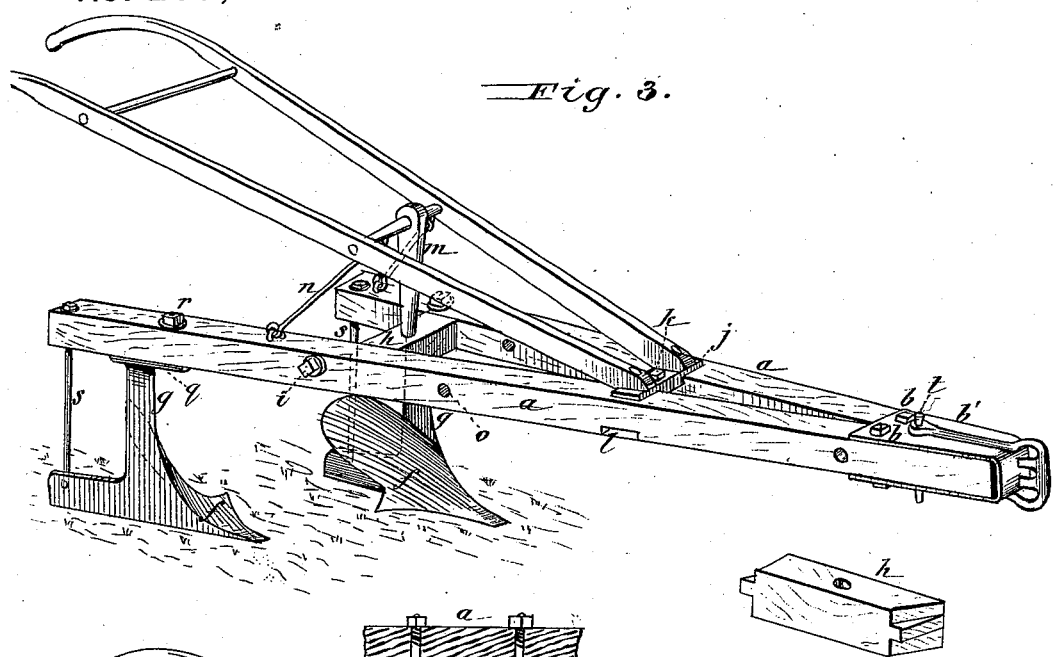
Fig. 3.
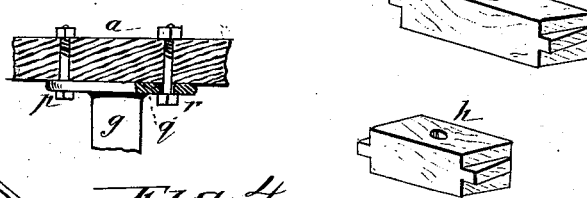
Fig. 4.
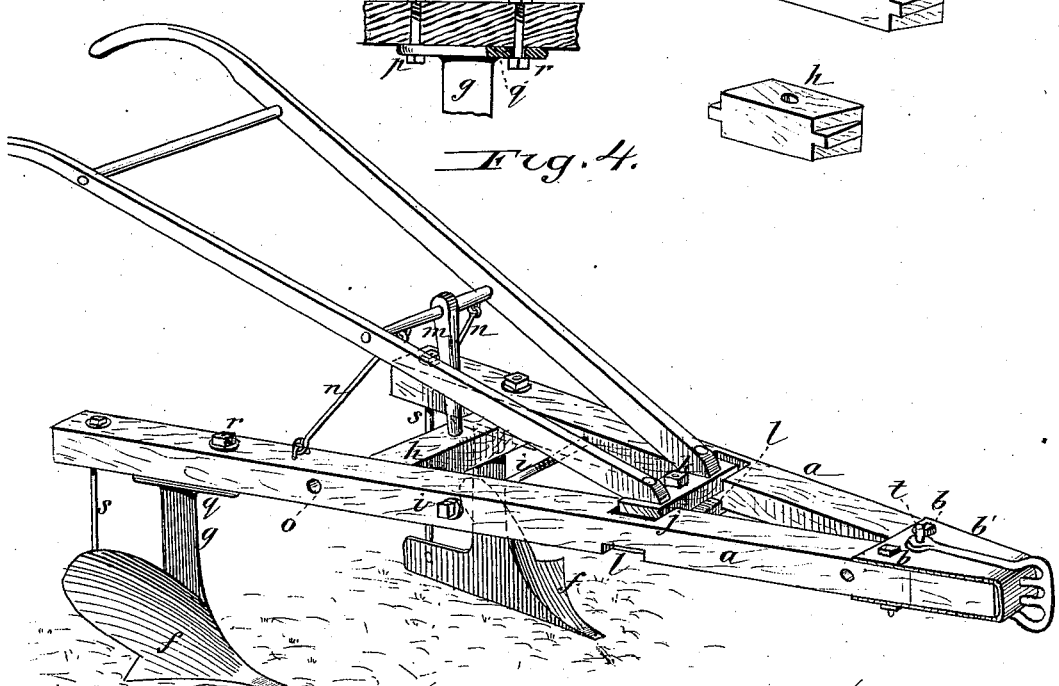

UNITED STATES PATENT OFFICE.

JOHN C. BEAN, OF CROSSVILLE, ILLINOIS.

IMPROVEMENT IN CULTIVATORS.

Specification forming part of Letters Patent No. 209,005, dated October 15, 1878; application filed September 7, 1878.

*To all whom it may concern:*

Be it known that I, JOHN C. BEAN, of Crossville, in the county of White and State of Illinois, have invented certain new and useful Improvements in Cultivator-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My improvements relate to convertible cultivators in which two plows are used, carried by beams hinged at their front ends. The beams are adapted for use as a single beam when brought together and to be spread apart, and the plow-standards are made changeable to adapt the cultivator for different kinds of work. For this purpose the beams are hinged by double joints to a covering-strap, and their front ends are grooved and tongued so as to brace and render their hinged connections firm when the beams are open. The handles are connected together as a single frame, and are adapted for use with the beams, whether the latter be open or closed, in connection with removable cross-pieces and a removable cross-bolt for the beams, in a manner which will be hereinafter specifically pointed out.

My object is to obtain a cultivator of simple and durable construction for cultivating corn, potatoes, cotton, &c., in the various stages of its growth, and for use generally in garden-work, and adapted in the simplest manner for such changes.

Referring to the drawings, Figure 1 represents the cultivator with the beams adjusted their greatest distance apart for throwing two furrows together to make a ridge for planting. Fig. 2 represents the cultivator with the beams closed together as a single beam and the plows in position for opening the ridge for planting. Fig. 3 represents the cultivator as adapted for cultivating young plants, and in which the front plow runs quite close along one side of the plants and throws the dirt from them, while the rear plow throws the dirt back to the plants to cover the roots and to fill the furrow made by the forward plow. Fig. 4 represents the cultivator as adapted for throwing the soil on opposite sides of two rows, the plows being transposed and the beams adjusted as in Fig. 1; and Fig. 5, details of the hinged and tongued and grooved ends of the beams.

The beams $a$ $a$ are hinged by separate vertical bolts $b$ $b$ to a broad iron strap, $b'$, which embraces the top, front, and under sides of their front ends, so as to allow them to open and close upon said bolts. When closed together, as in Fig. 2, they form a single beam, and are bound firmly together by a cross-bolt, $c$, just in rear of the separate hinge-bolts, said cross-bolt being used when the beams are so closed and drawn tightly together, and thus relieves the pivot-bolts of undue strain by binding the beams horizontally together.

When the beams are used in open position the cross-bolt $c$ is unscrewed or removed and the front ends of the beams are braced together by tongue-and-groove joints, the tongue or tongues $d$ of one beam matching with the grooves $e$ of the other, forming a lap-joint, Fig. 5, which keeps the ends of the beams in horizontal line, and thereby relieves the pivot-bolts of undue vertical strain, while the cross-bolt $c$, when used, relieves these pivot-bolts of undue horizontal strain, making a durable double-joint connection of the clevis-strap with the plow-beams, while maintaining a center draft in whatever position the beams may be adjusted.

The plows $f$ are secured by their standards $g$ to the rear ends of the beams in a manner to bring one behind the other, so that when the beams are closed the rear plow will be exactly in line with and behind the front plow, as in Fig. 2, and in position to open the ridge for planting, throwing the soil both right and left, so that while they occupy the line of a single plow they open the soil as a double plow. This advantage could not be obtained if they were arranged directly opposite each other upon the beams.

In the open positions of the beams they are firmly supported by a removable cross-piece, $h$, tenoned into mortises on the inner sides of the beams, and bound and held in place by a removable cross-bolt, $i$, passing through the beams back of the connection of the handles with the beams.

The handles are united by the usual cross-rods, and in addition to these their front ends are bolted to a cross-plate, *j*, which is bound by means of a vertical bolt, *k*, passing between the beams, to a cross-plate, *l*, fitted in notches on the under sides of the beams, so as to brace and hold the handles firmly upon the beams, whether the latter be open or closed. This allows the handles to be made of a single braced frame, and the beams are opened and closed by simply loosening the vertical binding-bolt *k*. The handles are supported by a vertical brace, *m*, connected with one of the handle cross-rods, and passing through the cross-mortise piece *h* bound between the beams when the latter are open. When, however, the beams are closed and the mortised cross-piece is removed, the handles are supported by brace-rods *n n*, hinged to the beams and to the handle cross-rods, as in Fig. 2.

This construction adapts the plow-beams to be opened and closed without disturbing the handle connections and supports, and allows the handles to be braced and used as a single frame.

I use two or more tenoned cross-pieces of different lengths, with a single removable binding-bolt, *i*. The longest cross-piece is for use with the plows when adjusted to their greatest distance apart, as in Figs. 1 and 4, in which the bolt *i* is secured in the holes *o* nearer the front ends of the handles, and with the shorter cross-piece the bolt *i* is placed as in Fig. 3, so that a single bolt answers to bind the beams together upon the cross-pieces at greater or less distances apart.

The plows are secured to the beams by a pivot-bolt, *p*, passing through the rear end of a T-head, *q*, of the plow-standard, while a bolt, *r*, passes through a cross-slot in the front end of the T-head, whereby the plows can be adjusted as desired to suit the draft or run. Brace-rods *s* connect the land-sides to the rear ends of the beams.

By this construction I obtain a convertible cultivator of simple strong construction, and easily adapted not only for changing the beams, but also for changing the plows for doing a variety of garden-work.

In using the cultivator for ridging, the beams are set apart their widest distance, as shown in Fig. 1, with the mold-boards arranged to throw the dirt toward each other to form the planting-ridge, the longest tenon cross-piece *h* being inserted between the beams, and the cross-bolt *i* changed to the forward beam-holes *o*. For opening the ridge for planting the seed, the tenoned cross-piece and binding-bolt *i* are removed, the beams brought close together and bound firmly by the front cross-bolt *c*, making a single beam, with their plows brought in line one behind the other, and throwing the dirt to the right and left, as shown in Fig. 2.

For cultivating and freeing the young plants from weeds, the plows are adjusted with the tenoned cross-piece of the least length in place, so that the front plow will loosen and turn the dirt from the plants, while the plow just following will turn the earth back again to cover the roots and fill the furrow, as shown in Fig. 3, completing one side of the row on a single run. For turning the earth to the opposite sides of two rows, the plows are removed from their beams and changed, as in Fig. 4.

The clevis-bolt *t* passes through the front strap in front of the beam pivot-bolts, and in a position between the beams, so as to have a central draft with said pivot.

I claim—

A cultivator-plow consisting of the hinged beams *a a*, with tongue and groove, the removable cross-pieces *h*, the removable cross clamping-bolts *i c*, the removable vertical brace *m*, the hinged braces *n n*, and the rigid frame-handles, whereby the beams are closed together or adjusted to any desired width, and adapted for use with the plows, as described.

In testimony that I claim the foregoing I have affixed my signature in the presence of two witnesses.

JOHN C. BEAN.

Witnesses:
 JOHN D. MARTIN,
 JAMES I. McCLINTOCK.